R. W. MAUDSLAY.
DASHBOARD FOR USE ON MOTOR AND OTHER VEHICLES.
APPLICATION FILED JUNE 4, 1915.
1,185,229.
Patented May 30, 1916.
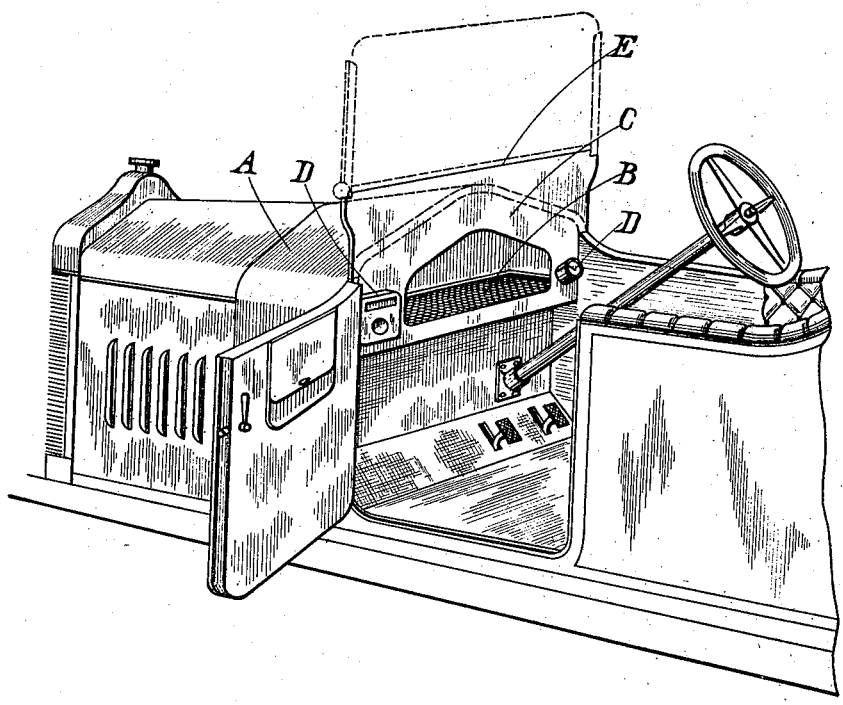
WITNESSES
INVENTOR
Reginald W. Maudslay.
PER
ATTORNEY

UNITED STATES PATENT OFFICE.

REGINALD WALTER MAUDSLAY, OF COVENTRY, ENGLAND.

DASHBOARD FOR USE ON MOTOR AND OTHER VEHICLES.

1,185,229.  Specification of Letters Patent.  Patented May 30, 1916.

Application filed June 4, 1915. Serial No. 32,248.

*To all whom it may concern:*

Be it known that I, REGINALD WALTER MAUDSLAY, engineer, a subject of the King of Great Britain, and resident of Coventry, in the county of Warwick, England, have invented certain new and useful Improvements in Dashboards for Use on Motor and other Vehicles, of which the following is a specification.

This invention relates to dashboards for use on motor and other vehicles of the type which is provided with a rearwardly projecting scuttle or cowl, and it has for its object to provide an improved arrangement which forms a shelf, and also leaves a good space for the attachment of instruments such as the speedometer, switch board, etc.

In dashboards of this kind there frequently is employed a shelf extending across the cowl, and by the present invention I use in addition to this a vertical, or approximately vertical, instrument board, which may extend up above the upper edges of the cowl and be provided with part of the wind screen joint. Thus the dash in this case extends right up to the lower edge of the screen. At each end of this board the various dashboard instruments would be fitted and the center of the board is cut away to provide an aperture giving access to the shelf under the cowl. This aperture is suitably shaped and enables the whole of the space behind the board to be used.

The accompanying perspective drawing shows the preferred method of carrying out this invention.

The usual cowl A projects rearwardly and carries a grid or shelf B, which is convenient for carrying light articles. The rear of the cowl has attached to it the board C, which is generally vertical. This is provided with an aperture to permit access to the shelf B, but there is enough surface at each end for the attachment of the electric lighting switch board, speedometer D, and other instruments. These instruments are therefore brought close to the occupants, and a further feature is that the board C may extend right up to the line E of the wind screen hinge. In fact this board may carry the wind screen joint as shown.

Preferably the wiring from the switch board, and the flexible shaft for the speedometer are hidden behind the dashboard and these and other parts may be so protected that they cannot be damaged by the articles placed upon the shelf under the scuttle. In this way the space under the cowl is utilized, the dashboard instruments brought close to the occupant of the car and a neat finish between the dashboard and the lower edge of the screen is obtained. Further, the arrangement strengthens up the dashboard.

What I claim as my invention, and desire to secure by Letters Patent is:—

The combination with a dashboard, a cowl, a wind shield, of a shelf built into the rear of the cowl and a vertically disposed board attached to the rear of the cowl and extending up to the lower edge of the wind shield and providing a suitable support on which the wind shield is carried, said board being provided with a centrally located aperture to permit access to said shelf and further provided with sufficient surface at each end for the attachment of the lighting switch, speedometer and other instruments.

In testimony whereof I have signed my name to this specification in the presence of two subscribing witnesses.

REGINALD WALTER MAUDSLAY.

Witnesses:
H. A. L. BULLOCK,
JOHN ARKLE.